United States Patent Office 3,629,263
Patented Dec. 21, 1971

3,629,263
DIGLYCIDYL ETHERS
Hans Batzer, Arlesheim, Basel-Land, Juergen Habermeier, Allschwil, Basel-Land, and Daniel Porret, Binningen, Switzerland, assignors to Ciba Limited, Basel, Switzerland
No Drawing. Filed Nov. 4, 1969, Ser. No. 870,547
Claims priority, application Switzerland, Nov. 11, 1968, 16,803/68
Int. Cl. C07d 49/32, 51/20, 51/30
U.S. Cl. 260—257    14 Claims

ABSTRACT OF THE DISCLOSURE

New diglycidyl ethers of mononuclear, five-membered or six-membered, unsubstituted or substituted, oxyalkylated N-heterocyclic compounds which contain two NH— groups in the molecule, by reaction of mononuclear, five-membered or six-membered, unsubstituted or substituted N-heterocyclic compounds, for example hydantoin, barbituric acid, uracil, dihydrouracil, parabanic acid and the corresponding derivatives, with alkylene oxide, for example ethylene oxide or propylene oxide, to give monoalcohols or dialcohols, and subsequent glycidylation of the OH— groups or of the OH— and NH— group to give the corresponding glycidyl ethers. The compounds are resin precursors.

---

The subject of the present invention is new diglycidyl ethers of general formula

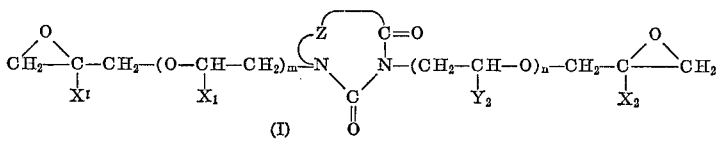

(I)

wherein $X_1$, $X_2$, $Y_1$ and $Y_2$ each denote a hydrogen atom or a methyl group and Z denotes a nitrogen-free, divalent residue which is required for the completion of a five-membered or six-membered, unsubstituted or substituted, heterocyclic ring, and $m$ and $n$ each denote an integer having a value of 0 to 30, preferably of 0 to 4, with the sum of $m$ and $n$ having to be at least 1.

The residue Z in Formula I preferably consists only of carbon and hydrogen or of carbon, hydrogen and oxygen. It can for example be a residue of formulae

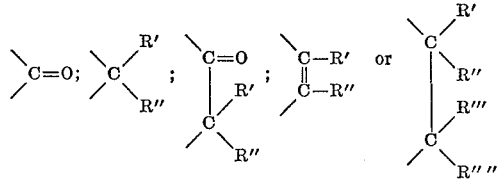

wherein R', R'', R''' and R'''' independently of one another can each denote a hydrogen atom or, for example, an alkyl residue, an alkenyl residue, a cycloalkyl residue, or an optionally substituted phenyl residue.

The new diglycidyl ethers of Formula I can be manufactured by reacting compounds of general formula

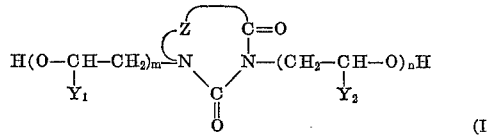

(II)

wherein $Y_1$, $Y_2$, Z, $m$ and $n$ have the same significance as in Formula I, in a single stage or in several stages, with an epihalogenohydrin or β-methylepihalogenohydrin, such as for example epichlorhydrin, β-methylepichlorhydrin or epibromhydrin, in a manner which is in itself known.

In the single-stage process the reaction of epihalogenohydrin with a compound of Formula II takes place in the presence of alkali, with sodium hydroxide or potassium hydroxide preferably being used. In this single-stage process the epichlorhydrin which is reacted in accordance with the process can be replaced entirely or partially by dichlorhydrin which under the process conditions and given appropriate addition of alkali is transiently converted to epichlorhydrin and then reacted as such with the monoalcohol or dialcohol of Formula II. In the preferentially used two-stage process the compound of Formula II is, in a first stage, added to an epihalogenohydrin in the presence of acid or basic catalysts to given the halogenohydrin-ether, and thereafter the latter is dehydrohalogenated in a second stage by means of alkalis such as potassium hydroxide or sodium hydroxide, to give the glycidyl ether.

Suitable acid catalysts for the two-stage process are especially Lewis acids, such as for example $AlCl_3$, $SbCl_5$, $SnCl_4$, $FeCl_3$, $ZnCl_2$, $BF_3$ and their complexes with organic compounds.

The reaction can also be accelerated by the addition of other suitable catalysts, for example alkali hydroxides, such as sodium hydroxide, alkali halides, such as lithium chloride, potassium chloride, sodium chloride, bromide and fluoride.

Preferably, the new glycidyl ethers according to the invention, of Formula I, are manufactured by reacting an epihalogenohydrin, preferably epichlorhydrin, in the presence of a basic catalyst, such as preferably a tertiary amine or a quaternary ammonium base or a quaternary ammonium salt, with a compound of Formula II and treating the resulting product containing halogenohydrin groups with agents which split off hydrogen halide.

Suitable catalysts for the addition of epichlorhydrin are above all tertiary amines, such as triethylamine, tri-n-propylamine, benzyldimethylamine, N,N'-dimethylaniline and triethanolamine; quaternary ammonium bases such as benzyltrimethylammonium hydroxide, quaternary ammonium salts such as tetramethylammonium chloride, tetraethylammonium chloride, benzyltrimethylammonium chloride, or benzyltrimethylammonium acetate and methyltriethylammonium chloride; also, ion exchange resins possessing tertiary or quarternary amino groups; also, trialkylhydrazonium salts such as trimethylhydrazonium iodide.

Suitable catalysts are furthermore also low molecular thioethers and sulphonium salts, or compounds which with the epihalogenohydrins can give thioethers or sulphonium compounds, such as hydrogen sulphide, sodium sulphide or mercaptans.

As such thioethers or sulphonium salts there may be mentioned:

diethyl sulphide,
β-hydroxyethylethylsulphide,
β-hydroxypropylethylsulphide,
ω-hydroxy-tetramethylene-ethylsulphide, thiodiglycol,
mono-β-cyanoethylthioglycol-ether,
dibenzylsulphide,
benzylethylsulphide,
benzylbutylsulphide,
trimethylsulphonium iodide,
tris(β-hydroxyethyl)sulphonium chloride,
dibenzylmethylsulphonium bromide,
2,3-epoxypropylmethylethylsulphonium iodide,
dodecylmethylsulphide and
dithiane.

Strong alkalis such as anhydrous sodium hydroxide or aqueous sodium hydroxide solution are as a rule used for the dehydrohalogenation, but other alkaline reagents, such as potassium hydroxide, barium hydroxide, calcium hydroxide, sodium carbonate or potassium carbonate can also be employed.

The dehydrohalogenation can in turn be carried out in several stages. Thus it is possible first to carry out a treatment at elevated temperature with solid sodium or potassium hydroxide and, after distilling off the excess epihalogenohydrin, to heat the residue in an inert solvent with a less than equivalent amount of concentrated alkali hydroxide solution, for example 50% strength sodium hydroxide solution.

Possible epihalogenohydrins are epibromhydrin, β-methylepichlorhydrin and above all epichlorhydrin. Good yields are obtained if an excess of epichlorhydrin and in particular preferably 4 to 40 mols of epichlorhydrin per hydroxyl or NH— group are used. During the first reaction, before the addition of alkali, a partial epoxidation of the bischlorhydrin-ether of a compound of Formula II already occurs. The epichlorhydrin, which acts as a hydrogen chloride acceptor, is at the same time partially converted into glycerine dichlorhydrin. This is regenerated to give back the epichlorhydrin on treatment with alkali.

The monoalcohols and dialcohols of general Formula II have hitherto not yet been described in the literature and are obtained in a known manner by reacting mononuclear N-heterocyclic compounds of general formula

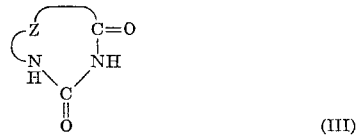

(III)

wherein Z has the same significance as in Formula I, with alkene oxides, preferably ethene oxide (ethylene oxide) or propene oxide (propylene oxide) in the presence of a suitable catalyst.

The addition of an alkene oxide to one or both NH— groups of the N-heterocyclic compounds of Formula III can be carried out in the presence of acid or alkaline catalysts, with a slight excess of equivalent epoxide groups of the alkene oxide being employed per equivalent NH— group of the N-heterocyclic compound of Formula III.

Preferably, however, alkaline catalysts such as tetraethylammonium chloride or tertiary amines are used in the manufacture of monoalcohols and dialcohols of Formula II in which the sum of $m$ and $n$ is 1 or 2. It is however also possible successfully to employ alkali halides such as lithium chloride or sodium chloride for this addition reaction; the reaction also takes place without catalysts.

In the manufacture of dialcohols of Formula II in which the sum of $m$ and $n$ is greater than 2, it is preferable to start from the simple dialcohols of Formula II in which $m$ and $n$ are each 1, and to add further alkene oxide to both OH— groups of this compound in the presence of acid catalysts.

The mononuclear N-heterocyclic compounds of Formula III used for the manufacture of the new alkene oxide addition products of Formula II are above all hydantoin, hydantoin derivatives, barbituric acid, barbituric acid derivatives, uracil, uracil derivatives, dihydrouracil and dihydrouracil derivatives, and also parabanic acid.

Hydantoin and its preferred derivatives correspond to the general formula

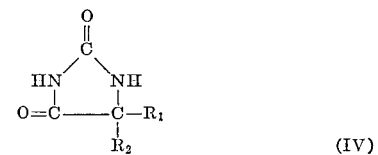

(IV)

wherein $R_1$ and $R_2$ each denote a hydrogen atom or a lower alkyl residue with 1 to 4 carbon atoms, or wherein $R_1$ and $R_2$ together form a tetramethylene or pentamethylene residue. Hydantoin, 5-methyl-hydantoin, 5-methyl-5-ethylhydantoin, 5 - n - propylhydantoin, 5-isopropylhydantoin, 1,3 -diaza - spiro(4,5) - decane-2,4-dione, 1,3-diaza-spiro(4.4)-nonane-2,4-dione and preferably 5,5-dimethylhydantoin may be mentioned.

Barbituric acid and its preferred derivatives correspond to the general formula

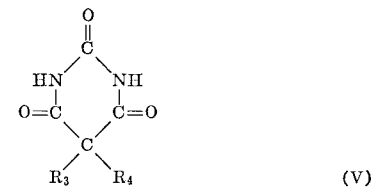

(V)

wherein $R_3$ and $R_4$ independently of one another each denote a hydrogen atom, an alkyl residue, an alkenyl residue, a cycloalkyl or cycloalkenyl residue or a substituted or unsubstituted phenyl residue.

The following may be mentioned:

barbituric acid,
5-ethylbarbituric acid,
5,5-diethylbarbituric acid,
5-ethyl-5-butylbarbituric acid,
5-ethyl-5-sec.-butylbarbituric acid,
5-ethyl-5-isopentylbarbituric acid,
5,5-diallylbarbituric acid,
5-allyl-5-isopropylbarbituric acid,
5-allyl-5-sec.-butylbarbituric acid,
5-ethyl-5(1′-methylbutyl)barbituric acid,
5-allyl-5(1′-methylbutyl)barbituric acid,
5-ethyl-5-phenylbarbituric acid and
5-ethyl-5(1′-cyclohexen-1-yl)barbituric acid.

Uracil and its preferred derivatives correspond to the general formula

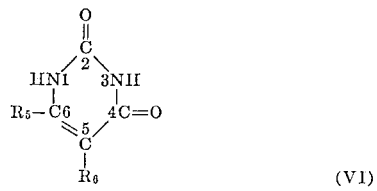

(VI)

wherein $R_5$ and $R_6$ both denote hydrogen or one of the two residues denotes a hydrogen atom and the other residue denotes a methyl group.

Uracils of Formula VI are uracil itself; also 6-methyluracil and thymin (=5-methyluracil).

Dihydrouracil (=2,4-dioxo-hexahydropyrimidine) and its preferred derivatives correspond to the general formula:

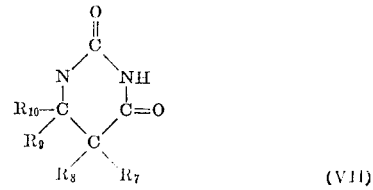

(VII)

wherein $R_7$ and $R_8$ both denote a hydrogen atom or identical or different alkyl residues, preferably alkyl residues with 1 to 4 carbon atoms, and $R_9$ and $R_{10}$ independently of one another each denote a hydrogen atom or an alkyl residue.

Preferably, in the above formula, the two residues $R_7$ and $R_8$ denote methyl groups, $R_9$ denotes a hydrogen atom or a lower alkyl residue with 1 to 4 carbon atoms and $R_{10}$ denotes a hydrogen atom. The following may be mentioned: 5,6-dihydrouracil, 5,5 - dimethyl-5,6-dihydrouracil (2,4-dioxo-5,5-dimethylhexahydropyrimidine) and 5,5-dimethyl-6-isopropyl-5,6-dihyrouracil (2,4 - dioxo-5,5-dimethyl-6-isopropylhexahydropyrimidine).

The new diglycidyl ethers of Formula I according to the invention react with the usual curing agents for polyepoxide compounds and can therefore be crosslinked or cured by the addition of such curing agents, analogously to other polyfunctional epoxide compounds or epoxide resins. Possible curing agents of this kind are basic or acid compounds.

As suitable curing agents there may for example be mentioned: amines or amides such as aliphatic, cycloaliphatic or aromatic, primary, secondary and tertiary amines, for example monoethanolamine, ethylenediamine, hexamethylenediamine, trimethylhexamethylenediamine, diethylenetriamine, triethylenetetramine, tetraethylenepentamine, N,N-dimethylpropylenediamine-1,3, N,N- diethylpropylenediamine - 1,3, bis(4-amino-3-methyl-cyclohexyl)methane, 3,5,5-trimethyl - 3 - (aminomethyl)cyclohexylamine ("isophoronediamine"), Mannich bases such as 2,4,6 - tris(dimethylaminomethyl)phenol; m - phenylenediamine, p-phenylenediamine, bis(4 - aminophenyl)methane, bis(4 - aminophenyl)sulphone, m - xylylenediamine; N-(2-aminoethyl)piperazine; adducts of acrylonitrile or monoepoxides such as ethylene oxide or propylene oxide, to polyalkylenepolyamines, such as diethylenetriamine or triethylenetetramine; adducts of polyamines such as diethylenetriamine or triethylenetetramine, in excess, and polyepoxides, such as diomethane-polyglycidylethers; ketimines, for example from acetone or methyl ethyl ketone and bis(p-aminophenyl)methane; adducts of monophenols or polyphenols and polyamines; polyamides, especially those from aliphatic polyamines, such as diethylenetriamine or triethylenetetramine, and dimerised or trimerised unsaturated fatty acids, such as dimerised linseed oil fatty acid ("Versamid"); polymeric polysulphides ("Thiokol"); dicyandiamide, anilineformaldehyde resins; polyhydric phenols, for example resorcinol, 2,2 - bis(4 - hydoxyphenyl)propane or phenolformaldehyde resins; boron trifluoride and its complexes with organic compounds, such as $BF_3$-ether complexes and $BF_3$-amine complexes, for example $BF_3$-monoethylamine complex; acetoacetanilide - $BF_2$ complex; phosphoric acid; triphenylphosphite; polybasic carboxylic acids and their anhydrides, for example phthalic anhydride, $\Delta^4$-tetrahydrophthalic anhydride, hexahydrophthalic anhydride, 4 - methylhexahydrophthalic anhydride, 3,6-endomethylene-$\Delta^4$-tetrahydrophthalic anhydride, methyl-3,6 - endomethylene - $\Delta^4$ - tetrahydrophthalic anhydride (=methylnadicanhydride), 3,4,5,6,7,7 - hexachlor - 3,6 - endomethylene-$\Delta^4$-tetrahydrophthalic anhydride, succinic anhydride, adipic anhydride, azelaic anhydride, sebacic anhydride, maleic anhydride, dodecenylsuccinic anhydride; pyromellitic dianhydride or mixtures of such anhydrides.

Cure accelerators can furthermore be employed during the cure; when using polyamides, dicyandiamide, polymeric polysulphides or polycarboxylic acid anhydrides as curing agents, suitable accelerators are for example tertiary amines, their salts or quaternary ammonium compounds, for example 2,4,6 - tris(dimethylaminomethyl) phenol, benzyldimethylamine, 2-ethyl-4-methyl-imidazole, 4-amino-pyridine, and triamylammonium phenolate; also alkali metal alcoholates such as for example sodium hexanetriolate. When curing with amines, monophenols or polyphenols, such as phenol or diomethane, salicylic acid or thiocyanates can for example be employed as accelerators.

The term "cure" as used here denotes the conversion of the abovementioned diepoxides into insoluble and infusible, crosslinked products, and in particular as a rule, with simultaneous shaping to give shaped articles such as castings, pressings or laminates and the like, or to give "two-dimensional structures" such as coatings, coverings, lacquer films or adhesive bonds.

Depending on the choice of the curing agent the cure can be carried out at room temperature (18–25° C.) or at elevated temperature (for example 50–180° C.).

If desired, the cure can also be carried out in two stages, by first prematurely stopping the cure reaction, or carrying out the first stage at only moderately elevated temperature, whereby a curable pre-condensate, which is still fusible and soluble (so-called "B-stage"), of the epoxide component and the curing agent component is obtained. Such a pre-condensate can for example be employed for the manufacture of "prepregs," compression moulding compositions or sintering powders.

Since the new diglycidyl ethers represent more or less low viscosity liquids, they are also outstandingly suitable for use as reactive diluents for epoxide resins and can therefor be advantageously used mixed with other curable diepoxide or polyepoxide compounds. As such there may for example be mentioned: polyglycidyl ethers of polyhydric alcohols, such as polyethylene glycols, polypropylene glycols or 2,2 - bis(4'-hydroxycyclohexyl)propane; polyglycidyl ethers of polyhydric phenols, such as 2,2-bis (4'-hydroxyphenyl)propane (=diomethane), 2,2-bis(4'-hydroxy-3',5'-dibromophenyl)propane, bis(4 - hydroxyphenyl)sulphone, 1,1,2,2 - tetrakis(4-hydroxyphenyl) ethane or condensation products of formaldehyde with phenols manufactured in an acid medium, such as phenol novolacs or cresol novolacs; polyglycidyl esters of polycarboxylic acids such as for example phthalic acid diglycidyl ester, isophthalic acid diglycidyl ester, tetrahydrophthalic acid diglycidyl ester or hexahydrophthalic acid diglycidyl ester; triglycidyl isocyanurate, N,N'-diglycidyl-5,5-dimethylhydantoin, and aminopolyepoxides, such as are obtained by dehydrohalogenation of the reaction products from epihalogenohydrin and primary or secondary amines, such as aniline or 4,4'-diaminodiphenylmethane; also, alicyclic compounds containing several epoxide groups, such as vinylcyclohexene diepoxide, dicyclopentadiene diepoxide, ethylene glycol-bis-(3,4-epoxytetrahydrodicyclopentadien-8-yl)-ether, (3',4' - epoxycyclohexylmethyl) - 3,4 - epoxycyclohexanecarboxylate, (3',4' - epoxy - 6' - methylcyclohexylmethyl) - 3,4-epoxy-6 - methylcyclohexanecarboxylate, bis (2,3 - epoxycyclopentyl) - ether or 3 - (3',4' - epoxycyclohexyl)-2,4-dioxa-spiro-(5.5)-9,10-epoxyundecane.

If desired, other known reactive diluents, such as for example styrene oxide, butyl glycidyl ether, isooctyl glycidyl ether, phenyl glycidyl ether, cresyl glycidyl ether, and glycidyl esters of synthetic highly branched, mainly tertiary, aliphatic monocarboxylic acids ("Cardura E") can be conjointly used.

A further object of the present invention are therefore curable mixtures which are suitable for the manufacture of shaped articles including two-dimensional structures and which contain the diglycidyl ethers according to the invention, optionally together with other diepoxide or polyepoxide compounds and, further, curing agents for epoxide resins, such as polyamines or polycarboxylic acid anhydrides.

The diepoxides according to the invention, or their mixtures with other polyepoxide compounds and/or curing agents can furthermore, at any stage before curing, be mixed with the usual modifiers such as extenders, fillers and reinforcing agents, pigments, dyestuffs, organic solvents, plasticisers, flow control agents, agents for conferring thixotropy, flameproofing substances and mould release agents.

As extenders, reinforcing agents, fillers and pigments which can be employed in the curable mixtures according to the invention, there may be for example be mentioned: coal tar, bitumen, textile fibres, glass fibres, asbestos fibres, boron fibres, carbon fibres, cellulose, polyethylene powder and polypropylene powder; quartz powder; mineral silicates such as mica, asbestos powder and slate powder; kaolin, aluminium oxide trihydrate, chalk powder, gypsum, antimony trioxide, bentones, silica aerogel ("Aerosil"), lithopones, baryte, titanium dioxide, carbon black, graphite, oxide pigments such as iron oxide, or metal powders, such as aluminium powder or iron powder.

Suitable organic solvents for modifying the curable mixtures are for example toluene, xylene, n-propanol, butyl acetate, acetone, methyl ethyl ketone, diacetone-alcohol, ethylene glycol monomethyl ether, monoethyl ether and monobutyl ether.

As plasticisers for modifying the curable mixtures it is for example possible to employ dibutyl phthalate, dioctyl phthalate and dinonyl phthalate, tricresyl phosphate, trixylenylphosphate, and also polypropylene glycols.

As flow control agents when employing the curable mixtures, especially in surface protection, it is for example possible to add silicones, cellulose acetobutyrate, polyvinyl butyral, waxes, stearates and the like (which are in part also employed as mould release agents).

Especially for use in the lacquer field, the diepoxide compounds can furthermore be partially esterified in a known manner with carboxylic acids, such as especially higher unsaturated fatty acids. It is furthermore possible to add other curable synthetic resins, for example phenoplasts or aminoplasts to such lacquer resin formulations.

The manufacture of the curable mixtures according to the invention can be carried out in the usual manner, with the aid of known mixing equipment (stirrers, kneaders, rolls and the like).

The curable epoxide resin mixtures according to the invention are above all employed in the fields of surface protection, of the electrical industry, of laminating processes and in the building industry. They can, in formulations suited in each case to the particular end use, be employed in the unfilled or filled state, optionally in the form of solutions or emulsions, as paints, lacquers, compression moulding compositions, sintering powders, dipping resins, casting resins, injection moulding formulations, impregnating resins and binders, adhesives, tool resins, laminating resins, sealing and filling compositions, floor covering compositions and binders for mineral aggregates.

In the examples which follow, unless otherwise stated, parts denote parts by weight and percentages denote percentages by weight. The relationship of parts by volume to parts by weight is as of the millilitre to the gram.

In order to determine the mechanical and electrical properties of the curable mixtures described in the examples which follow, sheets of 92 x 41 x 12 mm. were manufactured for determining the flexural strength, deflection, impact strength and water absorption. The test specimens (60 x 10 x 4 mm.) for determining the water absorption and for the flexing and impact test (VSM 77,103 and VSM 77,105, respectively) were machined from the sheets.

In order to determine the heat distortion point according to Martens (DIN 53,458), test specimens of dimensions 120 x 15 x 10 mm. were cast in each case.

Sheets of dimensions 120 x 120 x 4 mm. were cast for testing the arcing resistance and the tracking resistance (VDE 0303).

MANUFACTURE OF THE STARTING SUBSTANCES

Example A.—1,3-di($\beta$-hydroxy-n-propyl)-5,5-dimethylhydantoin

A mixture of 217 g. of 5,5-dimethylhydantoin (1.695 mols) 3.61 g. of lithium chloride (5 mol percent) and 560 ml. of dimethylformamide is stirred at 50° C. 230 g. of propene oxide (propylene oxide) (3.955 mols) are added dropwise to the clear solution over the course of 4 hours, at 50–55° C. The reaction is slightly exothermic. After the dropwise addition, the temperature is slowly raised to 90° C. After 5 hours at 90° C. the dimethylformamide is distilled off in a waterpump vacuum and thereafter the product is dried to constant weight at 100° C. and 0.1 mm. Hg 415 g. of a pale yellow highly viscous oil (100% of theory) are obtained. The crude product is distilled at 0.1 to 0.2 mm. Hg and 170–172° C.: 386.0 g. yield of pure material (93.5% of theory). On cooling the 1,3-di($\beta$-hydroxy-n-propyl)-5,5-dimethylhydantoin solidifies to give white crystals of melting point 65–67° C. The elementary analysis shows 11.81% N (calculated, 11.47% N), and the molecular weight was determined by vapour pressure osmometry to be 247 (theory 244). The infrared spectrum shows the absence of N–H-amide frequencies at 3.1 to 3.2$\mu$ and the presence of C—OH frequencies at 2.90$\mu$.

Example B.—1,3-di($\beta$-hydroxy-n-propyl)-5,5-diethylbarbituric acid 40.7 g. (0.7 mol) of propene oxide are added dropwise over the course of 1 hour to a mixture of 55.3 g. of 5,5-diethylbarbituric acid (0.3 mol), 2.77 g. of tetraethylammonium chloride (5 mol percent) and 400 ml. of dimethylformamide at 35° C. whilst stirring. Thereafter the mixture is gradually heated to 100° C. After 7 hours' stirring at 100° C. the mixture is worked-up in accordance with Example A. 92.5 g. of crude 1,3-di($\beta$-hydroxy-n-propyl)-5,5-diethylbarbituric acid (99.5% of theory) are obtained. The product boils at 138–148° C. under 0.08 mm. Hg; 75.2 g. of pure product (80% of theory) are obtained.

*Elementary analysis.*—Found (percent): 55.54, C; 8.03, H; 9.44, N. Calculated (percent): 55.98, C; 8.05, H; 9.32, N.

The IR (infrared) and H—NMR (nuclear magnetic resonance) spectrum can be reconciled with the following structure:

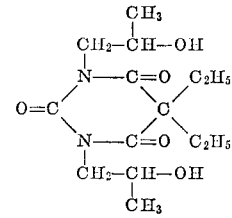

Example C.—1,3-di($\beta$-hydroxyethyl)-5,5-dimethyldantoin

A solution of 48.5 g. of ethene oxide (ethylene oxide) (1.1 mols) in 200 ml. of dimethylformamide, cooled to about 50 C., is allowed to run into a mixture of 64.2 g. of 5,5-dimethylhydantoin (0.5 mol), 4.15 g. of tetraethylammonium chloride and 100 ml. of dimethylformamide at room temperature. The mixture is gradually heated to 50–60° C., whereupon the reaction starts with evolution of heat. After the exothermic reaction the mixture is stirred for a further 3 hours at 90° C. Working-up takes place as in Example A. 108.0 g. of a viscous oil (99.7% of theory) are obtained. Purification takes place by vacuum distillation (boiling point$_{0.3}$=185–186° C.), and the pure 1,3-di($\beta$-hydroxyethyl)-5,5-dimethylhyantoin is obtained in 86.8% yield. The product solidifies to give colourless small crystals which melt at about 40° C.

*Analytical data.*—Found (percent): 49.54 C, 7.39 H. Calculated (percent): 49.99 C, 7.46 H. (M$_{osmometric}$); Found, 212; calculated, 216 (M$_{theory}$).

Example D.—1,3-di($\beta$-hydroxyethyl)-5-phenyl-5-ethylbarbituric acid 116.2 g. of 5-phenyl-ethylbarbituric acid (0.5 mol) and 4.14 g. of tetraethylammonium chloride (5 mol percent)

in 300 ml. of dimethylformamide were reacted with 54.9 g. of ethene oxide in 250 ml. of dimethylformamide in accordance with Example C.

160.0 g. of crude 1,3-di(β-hydroxyethyl)-5-phenyl-5-ethylbarbituric acid (100% of theory) are obtained. The product is purified by distillation (boiling point$_{0.3}$=220–221° C.); 139 g. (corresponding to 86.8% of theory) of pure substance are obtained. On cooling the substance crystallises; melting point=107–109° C.

*Analytical data.*—Found (percent): 59.72, C; 6.41, H; 9.03, N. Calculated (percent): 59.99, C; 6.29, H; 8.75, N.

Example E.—3-(β-hydroxyethyl)-6-methyluracil 31.9 g. of ethylene oxide in 200 ml. of dimethylformamide are reacted with 37.8 g. of 6-methyluracil (0.3 mol) and 2.77 g. of tetraethylammonium chloride in 100 ml. of dimethylformamide in accordance with Example C. After working-up according to Example A 57.6 g. of crude crystalline 3-(β-hydroxyethyl)-6-methyluracil (100% of theory) are obtained. The product is purified by recrystallisation from methanol/H$_2$O (1:1). Colourless crystals of melting point 216–218° C. are obtained.

*Analytical data.*—Found (percent): 49.24, C, 5.98, H; 17.14, N. Calculated (percent): 49.40, C; 5.92, H; 16.46, N.

Example F.—1,3-di-(β-hydroxyethoxyethoxyethyl)-5,5-dimethylhydantoin

A clear colourless solution is prepared at 60° C. from 108.1 g. of 1,3-di(β-hydroxyethyl)-5,5-dimethylhydantoin (0.5 mol) [manufactured according to Example C], 500 ml. of dioxan and 2 ml. of a 47% strength boron trifluoride-diethyl etherate solution in diethyl ether. 88.1 g. of ethene oxide (about 2 mols) are introduced into this solution over the course of 2 hours and 20 minutes. Here the procedure followed is to pass a constant ethene oxide gas stream of such strength into the solution that practically all the ethene oxide is absorbed. The amount of the ethene oxide introduced is continuously controlled by means of a suitable gas flow meter (rotameter). The reaction is weakly exothermic so that after removing the external heating the temperature of mixture rises about 10 degrees to 70° C. After stopping the stream of ethene oxide the mixture is cooled to 15° C. and treated with 15 ml. of 50% strength sodium hydroxide solution. The mixture is filtered and the clear, amber-coloured solution is concentrated on a rotational evaporator (60–80° C., 15 mm. Hg) and thereafter treated at 80° C./0.1 mm. Hg until constant weight is reached. An oil is obtained in quantitative yield, of which the IR (infrared) spectrum shows, in addition to the absorption due to the dimethylhydantoin, a strong OH absorption (2.92–3.02μ) and a very strong C—O—C absorption (8.9–9.4μ). The molecular weight is determined by vapour pressure osmometry to be M=394 (theory=392.5), and elementary analysis shows 51.7% C and 8.4% H (calculated: 52.0% C and 8.2% H).

A sample of this substance is dissolved in chloroform and extracted by shaking with a little 10% strength sodium hydroxide solution, and after separating off the aqueous phase the chloroform layer is dried over magnesium sulphate. Thereafter the product is precipitated from petroleum ether/cyclohexane, and the resulting light yellow oil is taken up in methylene chloride and treated until constant weight is reached (finally 60° C./0.1 mm. Hg). The product purified in this way is practically a single substance according to a thin layer chromatogram.

The H—NMR (nuclear magnetic resonance) spectrum and its integration show that the following 32 protons are present (overall formula: C$_{17}$H$_{32}$N$_2$O$_8$):

6 methyl portions—at δ=1.40
2 C—OH protons—at δ about 3.55
24 methylene protons—at δ about 3.65

Since the addition of the ethene oxide presumably occurs statistically on both sides of the 1,3-di(β-hydroxyethyl)-5,5-dimethylhydantoin, the presence of essentially the following structure must be assumed on the basis of the results quoted:

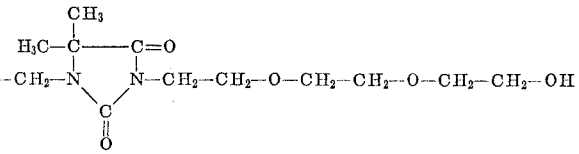

Example G.—1,3-di-(β-hydroxyethyl)-5,5-dimethyl-6-isopropyl-5,6-dihydrouracil A solution of 440.5 g. of ethene oxide (10 mols) in 500 ml. of dimethylformamide is added at 10° C., whilst stirring, to a suspension of 548 g. of 2,4-dioxo-5,5-dimethyl-6-isopropylhexahydropyrimidine (=5,5-dimethyl-6-isopropyl-5,6-dihydrouracil) (3 mols), 3 litres of commercial dimethylformamide and 20.0 g. of lithium chloride. This mixture is slowly and steadily heated to 90° C. over the course of 4.5 hours whilst stirring, whereby a slightly cloudy dark yellow solution is produced. The mixture is now stirred for a further 12 hours at 90° C. and subsequently cooled; the pH-value of the solution is 8. It is then neutralised with 25% strength sulphuric acid and filtered. The clear dark-coloured solution is concentrated on a rotational evaporator at 80° C. under a water-pump vacuum; thereafter traces of easily volatile constituents are removed at 80° C. and 0.1 mm. Hg.

810 g. of a dark highly viscous substance (10% of theory) are obtained. For purification, the substance is subjected to a high vacuum distillation. 630.4 g. of distillate (77.8% of theory, relative to dihydrouracil derivative employed) of melting point 183–188° C. at 0.25–0.30 mm. Hg are obtained.

The elementary analysis, the infrared spectroscopy and the nuclear resonance spectroscopy show that the substance produced in this way is the desired 1,3-di-(β-hydroxyethyl)-5,5-dimethyl-6-isopropyl-5,6-dihydrouracil.

*Elementary analysis.*—Found (percent): 57.45, C; 8.85, H; 10.32, N. Calculated (percent): 57.33, C; 8.88, H; 10.29, N.

The infrared spectrum, through the absence of the NH— frequencies and through the presence of, inter alia, the following absorptions shows that the reaction takes place as desired:

2.92μ (OH), 5.86μ+6.04μ (C=O), 9.50μ (C—O)

The nuclear magnetic resonance spectrum (60 mc. H—NMR, recorded in deuterochloroform no longer shows any signals for CO—NH— grouping, and shows, through a quartet at δ=0.75; 0.85; 0.99; 1.11 (CH—CH$_3$), through a doublet at δ=1.26 and 1.33 ([CH$_3$]$_2$=C), through a septet at δ=1.73–2.32

and through a further 11 protons at δ=3.0–4.4, that the following structure applies:

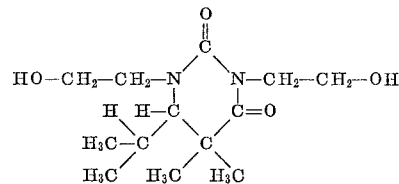

Example H.—1,3-di-(β-hydroxypropyl)-5,5-dimethyl-6-isopropyl-5,6-dihydrouracil A suspension is prepared from 548 g. of 2,4-dioxo-5,5-dimethyl-6-isopropyl-5,6-dihydrouracil, 3.5 litres of commercial dimethylformamide and 20.0 g. of lithium chloride. The mixture is warmed to 40° C. and 581.0 g. of propene oxide (10 mols) are uniformly added dropwise over the course of 3 hours with good stirring. This mixture is then warmed to 80° C. over the course of 1 hour and stirred at this temperature for 6 hours. The reaction mixture is subsequently cooled and filtered. The clear pale yellow filtrate is concentrated at 100° C. under a waterpump vacuum and is subsequently treated at 100° C. under 0.07 mm. Hg until constant weight is reached. 742 g. of a slightly orange-coloured, highly viscous, substance are obtined (82.7% of theory).

The nuclear magnetic resonance spectrum (60 mc. H—NHR, recorded in deuterochloroform) shows, through signals at δ=0.70; 0.81 (both split) and δ=0.95; 1.07; 1.14; 1.25 and 1.38; and also through a multiplet at δ=1.60–2.20; at δ=2.80–3.20 and at δ=3.20–4.20, that the desired reaction has occurred. Equally, the infrared spectrum shows, through the absence of NH— frequencies and through the OH— frequencies apppearing at 2.97μ, that the new diol essentially has the following structure:

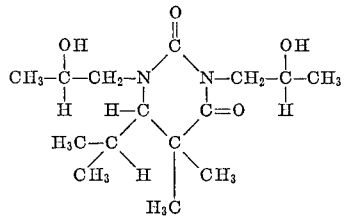

Example J.—1,3-di-(β-hydroxyethyl-polyethoxyethyl)-5,5-dimethylhydantoin 21.6 g. of 1,3-di-(β-hydroxyethyl)-5,5-dimethylhydantoin (manufactured according to Example C) (0.1 mol) are dissolved in 600 g. of anhydrous dioxan and stirred at 65° C. 1.5 ml. of 47% strenght ethereal boron trifluoride-diethyl etherate solution are added and 264.3 g. of ethylene oxide (6.0 mols)=134.4 litres are introduced in the gas form over the course of 4 hours, whilst stirring. The ethylene oxide stream is metered by means of a gas flow meter (rotameter). The reaction is exothermic, so that heating can be dispensed with; occasionally it is even necessary to cool slightly with ice water in order to maintain the reaction temperature of about 65° C. The mixture is left to stand overnight and 18 ml. of 1 N NaOH are stirred in so as to neutralise the boron trifluoride. The cloudy solution is filtered and the water-clear, colourless filtrate is concentrated on a rotational evaporator under 20 mm. Hg. Thereafter volatile constituents are removed at 80° C./0.08 mm. Hg. 218 g. of a colourless oil of low viscosity are obtained, corresponding to an ethylene oxide uptake of 196.4 g. (=4.466 mols). The analyses show the following results: the proton magnetic resonance spectrum (60 mc. H—NMR, recorded in $CDCl_3$ at 35° C.) essentially only still shows the signals for C—$CH_3$ at δ=1.30 and a very intense multiplet at about δ=3.62, due to the —($CH_2$—$CH_2$—O)$_n$— groups.

Elementary analysis shows the following values: 53.3% C, 8.9% H and 1.6% N. This means that on average about 20–23 ethylene oxide units are bonded to each N atom of the hydantoin. Gel permeation analysis shows a molecular weight distribution according to which the distribution function has a maximum at about 20–24 ethylene oxide units per N atom, corresponding to a molecular weight of about 2000–2500.

The average molecular weight was determined by vapour pressure osmometry to be 1100–1200, and this value is confirmed by the molecular weight distribution curve of the gel permeation analysis.

Example K.—1,3-di-(β-hydroxy-n-propyl)-5-isopropylhydantoin

A mixture of 995.0 g. of 5-isopropylhydantoin (7 mols), 2000 ml. of dimethylformamide and 14.8 g. of lithium chloride is stirred at 50° C. 1220 g. of propene oxide (21 mols) are slowly added dropwise over the course of 6 hours. Thereafter the temperature is gradually raised to 70° C. and after a total of 15 hours the reaction mixture is allowed to cool. It is adjusted to pH=7 with a few drops of 2 N $H_2SO_4$ and the pale yellow solution is filtered. The solution is completely concentrated at 90° C. bath temperature on a rotational evaporator under a waterpump vacuum and is subsequently treated at 90° C./0.1 mm. Hg until constant weight is reached. 1654.5 g. of a pale yellow highly viscous product (91.7% of theory) are obtained.

The product can be purified by vacuum distillation; at 158° C., under 0.08–0.01 mm. Hg, 76% of the material employed distil as a colourless oil which slowly crystallises.

The infrared spectrum shows, through the absence of NH absorptions and through the presence of very intense OH absorptions at 2.93μ, that the desired diol has been produced.

The proton magnetic resonance spectrum also shows that the resulting product mainly consists of 1,3-di-(β-hydroxy-n-propyl)-5-isopropylhydantoin.

Example L.—1,3-di-(β-hydroxy-n-propyl)-5,5-dimethylhydantoin

A mixture of 128.1 g. of 5,5-dimethylhydantoin (1 mol), 1.0 g. of lithium chloride and 224 g. of 1,3-di-(β-hydroxy-n-propyl)-5,5-dimethylhydantoin manufactured according to Example A) is stirred at 120° C. A clear solution is thereby produced. 133.9 g. of propene oxide (2.2 mols) are added dropwise over the course of course of 1 hour with good stirring. The temperature hereupon drops down to 60° C. After the dropwise addition the mixture is stirred for a further 6 hours at 70° C. A total of 461.1 g. of crude 1,3-di-(β-hydroxy-n-propyl)-5,5-dimethylhydantoin (98.3% of theory) is obtained, agreeing, in its properties with the product described in Example A.

Example M.—1,3-di-(β-hydroxyethyl)-5,5-dimethylhydantoin

A mixture of 128.12 g. of 5,5-dimethylhydantoin, 1.06 g. of lithium chloride and 193.73 g. of ethylene glycol carbonate is heated from 118° C. to 190° C. over the course of 5 hours whilst stirring. The reaction is slightly exothermic and from about 130° C. onwards a vigorous evolution of $CO_2$ starts. The mixture is stirred for a further 1.1 hours at 190° C., and the $CO_2$ evolution and hence the reaction are then complete. 1,3-di-(β-hydroxyethyl)-5,5-dimethylhydantoin, having the same properties as the product described in Example C, is produced in quantitative yield: boiling point $_{0.1}$=174–177° C. The nuclear resonance spectrum can be reconciled with this structure and no longer shows any signals for NH groups.

Example N.—1,3-di-(β-hydroxy-n-propyl)-5,5-diethylhydantoin

A solution of 125.0 g. of 5,5-diethylhydantoin (0.8 mol), 300.0 g. of dimethylformamide and 2.00 g. of lithium chloride is stirred at 52° C. 128.0 g. of propene oxide (2.2 mols) are added dropwise over the course of 2½ hours. Stirring is then continued for 5 hours at 85–90° C. The reaction mixture is adjusted to pH=7 with 2–3 drops of 25% strength sulphuric acid, and is filtered. The clear solution is concentrated on a rotational evaporator at 80° C. bath temperature, under a waterpump vacuum, and is subsequently treated under a high vacuum (0.1 mm. Hg) at 80° C. until constant weight is reached.

206.0 g. of a yellow, viscous, product (95.0% of theory), which can be purified by distillation, are obtained. At 179–181° C./0.15 mm. Hg 80.0% of the crude product employed distil as a colourless liquid. The infrared spectrum shows inter alia through the absence of the NH absorptions and through strong OH bands at 2.89μ that the reaction has followed the desired course. The proton magnetic resonance spectrum (60 mc. H—NMR, recorded in deuterochloroform) shows inter alia through the signals for 2×(CH₃—CH₂) (multiplet at δ=0.68–1.02), for 2×(CH₃—CH—OH) (doublet with fine structure at δ= 1.18 to 1.33) and for 2×CH₃—CH₂— (δ=2.63–2.05) that the product has the following formula:

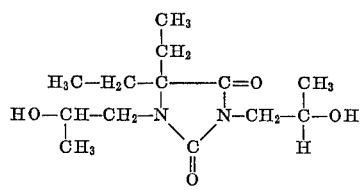

Example O.—1,3-di-(β-hydroxy-n-propyl)-5-ethyl-5-methylhydantoin

A mixture of 256.3 g. of 5-ethyl-5-methylhydantoin (1.805 mols), 675 ml. of dimethylformamide and 4.51 g. of lithium chloride is stirred at 50° C. 288.0 g. of propene oxide (4.96 mols) are slowly added dropwise over the course of 2 hours. Thereafter the temperature is gradually raised to 90° C. over the course of 10 hours. The reaction mixture is brought to pH=7 with 4 drops of 2 N hydrochloric acid, filtered and concentrated on a rotational evaporator at 90° C. bath temperature, under a waterpump vacuum. It is then treated at 90° C. under 0.1 mm. Hg until the weight remains constant. 465 g. of a clear pale yellow product (99.5% of theory) are obtained.

Purification is carried out by high vacuum distillation. A colourless highly viscous substance which distills at 145–148° C./0.06 mm. Hg is obtained in 78% yield of pure substance, relative to 5-ethyl-5-methylhydantoin employed.

Elementary analysis gives the following values: Found (percent): 55.63, C; 8.66, H; 10.82, N. Calculated (percent): 55.79, C; 8.58, H; 10.85, N.

The infrared spectrum further shows inter alia through an intense OH band at 3485 cm.⁻¹ that the reaction has succeeded.

The nuclear magnetic resonance spectrum (60 mc. H—NMR, recorded in CDCl₃) furthermore shows, through the following signals, that the structure given below is present:

EXAMPLES OF MANUFACTURE

Example 1

60.2 g. of 1,3-di-(β-hydroxy-n-propyl)-5,5-diethylbarbituric acid (0.2 mol) [manufactured according to Example B] are heated to 105° C., 0.4 ml. of 47% strength boron trifluoridediethyl etherate solution in diethyl ether are then added and 37.0 g. of epichlorhydrin (0.4 mol) are added dropwise over the course of 1 hour with good stirring. Stirring is then continued for 2 hours at 105° C.

Thereafter the reaction mixture is cooled to 60° C. and 300 ml. of toluene are added. 41.6 g. of 50% strength aqueous sodium hydroxide solution are then added dropwise whilst stirring, at 60° C. and under a slight waterpump vacuum, whereupon the water present in the reaction mixture separates off azeotropically through circulatory distillation.

The reaction mixture is then treated with 150 ml. of epichlorhydrin, filtered and concentrated at 60° C. in a waterpump vacuum; thereafter the residue is dried at 60° C. until constant weight is reached. A clear, yellow resin with 2.46 epoxide equivalents/kg. (=50.6% of theory) is obtained in 13% yield.

Example 2

A solution of 65.0 g. of 1,3-di-(β-hydroxyethyl)-5,5-dimethylhydantoin (0.3 mol.) [manfuactured according to Example C] in 150 ml. of dioxane is mixed with 2.50 ml. of tin tetrachloride at 100° C. 55.5 g. of epichlorhydrin (0.6 mol.) are added dropwise to the well-stirred solution at 100–105° C. over the course of 2 hours. Stirring is continued for 1 hour at 105° C. The mixture is then cooled to 60° C. and 36.70 g. of 98% strength sodium hydroxide powder (0.9 mol.) are added in six portions over the course of 30 minutes, with good stirring. The mixture is stirred for a further 10 minutes at 60° C. and cooled. The reaction mixture is filtered and the solution is concentrated at 60° C. under a waterpump vacuum. Thereafter the residue is dried at 60° C. and under a vacuum of 10⁻¹ mm. Hg 56.0 g. of viscous light yellow resin (56.9% of theory) containing 3.70 epoxide equivalents/kg. (corresponding to 60.6% of theory) and a total chlorine content of 6.50% are obtained.

Example 3

A mixture of 32.50 g. of 1,3-di(β-hydroxyethyl)-5,5-dimethylhydantoin (manufactured according to Example C) [0.15 mol], 925 g. of epichlorhydrin (10 mols) and 1.25 g. of tetraethylammonium chloride is stirred for 4½ hours at 90° C. The epoxide content of a sample freed of epichlorhydrin is then 2.30 epoxide equivalents/kg.

| 3 protons at δ=0.62, 0.77, 0.88 | Triplet | —CH₂—CH₃ |
| --- | --- | --- |
| 6 protons at δ=1.15 | Doublet with fine structure | HO—C(H)(—CH₃)— |
| 3 protons at δ=1.42 | Singlet | —C(—CH₃)— |
| 2 protons at δ=1.52–2.0 | Quartet with fine structure | —C(—CH₂—CH₃)— |
| Remaining protons at δ=2.85–4.25 | | |

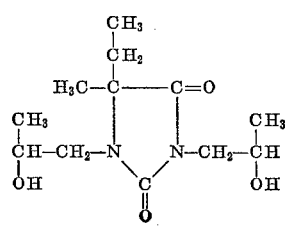

The mixture is cooled to 55° C., 0.5 g. of tetraethylammonium chloride are added and 31.2 g. of 50% strength aqueous sodium hydroxide solution are added dropwise over the course of 1½ hours with good stirring and under a slight waterpump vacuum; at the same time the water present in the reaction mixture is continuously removed by azeotropic circulatory distillation. After the dropwise addition distillation is continued for 15 minutes, the mixture is then cooled to room temperature, the precipitated sodium chloride is filtered off and the epichlorhydrin solution is extracted by shaking with 80 ml. of water. After separating off the water phase the epichlorhydrin solution is concentrated at 60° C. in a waterpump vacuum. Thereafter the product is dried at 60° C. and 10⁻¹ mm. Hg to constant weight.

49.0 g. (=99.8% of theory) of a light ochre-coloured resin are obtained, having an epoxide content of 5.68 epoxide equivalents/kg. (93.2% of theory) and a viscosity of 350 cp. (at 25° C.). The chlorine content of the crude product is 2.0%. The product is subjected to a vacuum distillation in order to purify it and boils at 182–184° C. under 0.22 mm. Hg. The epoxide content of the purified product is 5.86 equivalents/kg. (representing 96.3% of theory). The chlorine content is 0.3%. The IR (infrared) spectrum shows the presence of the following structure:

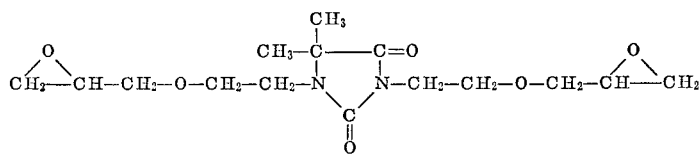

Example 4

A mixture of 32.5 g. of 1,3-di-(β-hydroxyethyl)-5,5-dimethylhydantoin (manufactured according to Example C) and 925.0 g. of epichlorhydrin (10 mols) is stirred for 6 hours at 115–117° C. It is then cooled to 60° C. and 31.2 g. of 50% strength aqueous sodium hydroxide solution are added over the course of 2 hours, with good stirring and under a slight waterpump vacuum, with the water present in the mixture being continuously removed in accordance with Example 3. The mixture is worked up in accordance with Example 3 and 46.6 g. of an ochre-coloured resin (94.7% of theory) are obtained, having an epoxide content of 5.35 epoxide equivalents/kg. (corresponding to 87.8% of theory); the total chlorine content is 1.40%.

Example 5

A mixture of 32.5 g. of 1,3-di(β-hydroxyethyl)-5,5-dimethylhydantoin (manufactured according to Example C), 0.3180 g. of lithium chloride and 925 g. of epichlorhydrin is stirred for 4½ hours at 114–117° C. and is then cooled to 60° C., and a further 0.127 g. of lithium chloride are added. 31.2 g. of 50% strength aqueous sodium hydroxide solution are added dropwise over the course of 1.5 hours at 60° C., with good stirring. The water present in the reaction mixture is at the same time continuously removed by azeotropic circulatory distillation. The mixture is then worked-up as described in Example 3. A light orange-coloured resin having an epoxide content of 4.73 epoxide equivalents/kg. (corresponding to 77.5% of theory) and a viscosity of 380 cp. (at 25° C.) is obtained in 100% yield.

Example 6

48.9 g. of 1,3-di(β-hydroxy-n-propyl)-5,5-dimethylhydantoin (0.2 mol) [manufactured according to Example A], 1.65 g. of tetraethylammonium chloride and 740 g. of epichlorhydrin are stirred for 5 hours at 90° C. The mixture is then cooled to 57° C., 0.66 g. of tetraethylammonium chloride are added and 41.6 g. of 50% strength sodium hydroxide solution (0.52 mol) are added dropwise over the course of 2 hours with good stirring, and whilst conducting an azeotropic circulatory distillation and water separation.

The mixture is worked up in accordance with Example 3 and a yellow resin having 4.33 epoxide equivalents per kg. (772% of theory) is obtained in 89.2% yield (63.6 g.).

Example 7

16.5 g. of 3-β-hydroxyethyl-6-methyluracil (0.097 mol) [manufactured according to Example E], 359.0 g. of epichlorhydrin and 0.8050 g. of tetraethylammonium chloride (about 5 mol percent) are stirred for 4 hours at 90° C.; a pale yellow clear solution is thereby produced.

A further 0.3210 g. of tetraethylammonium chloride (2 mol percent) are now added and 20.2 g. of 50% strength aqueous sodium hydroxide solution (0.2525 mol) are added dropwise over the course of 1.5 hours whilst stirring and applying a waterpump vacuum; at the same time the water present in the reaction mixture is continuously removed by azeotropic circulatory distillation. After further working-up in accordance with Example 3, 23.9 g. of an amber-coloured viscous resin (87.3% of theory) are obtained, having an epoxide content of 5.52 epoxide equivalents/kg. (78.3% of theory). The IR (infrared) spectrum shows, in addition to the epoxide absorptions, inter alia through the presence of the C—O—C absorption at 9.0 to 9.1μ and through the absence of the N—H amide absorption at 3.1 to 3.2μ that the following product is mainly present:

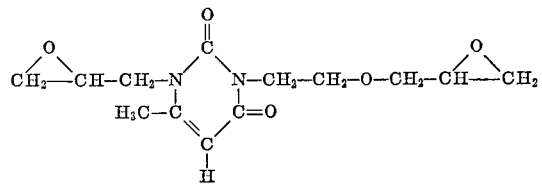

Example 8

A mixture of 32.5 g. of 1,3-di(β-hydroxyethyl)-5,5-dimethylhydantoin (0.15 mol) [manufactured according to Example C], 638 g. of β-methylepichlorhydrin (6 mols) and 2.48 g. of tetraethylammonium chloride is stirred for 7 hours at 100° C.

The mixture is then cooled to 60° C. and 31.2 g. of 50% strength sodium hydroxide solution (0.39 mol) are added with good stirring and separation of water in accordance with the process described in Example 3, and the mixture is worked-up in accordance with Example 3.

53.5 g. of a pale yellow oil (100% of theory) having 4.46 epoxide equivalents/kg. (79.4% of theory) are obtained. The product, which mainly consists of the compounds of formula

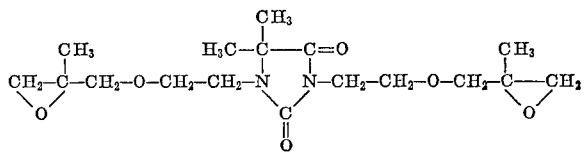

can be purified by distillation. A colourless oil of low viscosity, having a boiling point of 176–178° C. at 0.15 mm. Hg is obtained. The epoxide content is 5.18 epoxide equivalents/kg. (92% of theory).

Example 9

A mixture of 17.5 g. of 1,3-di(β-hydroxyethyl)-5-ethyl-5-phenylbarbituric acid (0.0547 mol) [manufactured according to Example D], 202 g. of epichlorhydrin and 0.45 g. of tetraethylammonium chloride is stirred for 4 hours at 114–117° C. It is then cooled to 60° C. and 11.4 g. of 50% strength sodium hydroxide solution are added with good stirring and separation of water according to the process described in Example 3, and the mixture is worked-up in accordance with Example 3. 14.7 g. of a light yellow viscous resin (65.5% of theory) having an epoxide content of 2.65 epoxide equivalents/kg. are obtained.

Example 10

A mixture of 19.7 g. of 1,3-di(β-hydroxyethoxyethoxyethyl)-5,5-dimethylhydantoin (0.05 mol) [manufactured according to Example F], 230 g. of epichlorhydrin and 0.4 g. of tetraethylammonium chloride is stirred for 5 hours at 90° C. It is then cooled to 55° C. and 10.4 g. of 50% strength aqueous sodium hydroxide solution (0.13 mol) are then added dropwise over the course of 1.5 hours with continuous removal of water from the circulation (in accordance with Example 3) and with good stirring. The mixture is then worked-up according to Example 3, with the washing out with water here however being omitted.

24.8 g. of an amber-coloured resin of low viscosity (98% of theory) are obtained, the epoxide content being 3.18 epoxide equivalents/kg. (80.2% of theory). The resin is completely soluble in water, ethanol, chloroform and the like. The IR (infrared) spectrum shows that the diglycidyl ether of 1,3-di-(β-hydroxyethoxyethoxyethyl)-5,5-dimethylhydantoin has been produced.

Example 11

(a) Laboratory experiment.—A mixture of 660 g. of 1,3 - di - (β - hydroxy - n - propyl) - 5,5 - dimethylhydantoin (1.852 mols) (manufactured according to Example A), 3268 g. of epichlorhydrin (35.3 mols) and 14.68 g. of tetraethylammonium chloride is stirred for 1½ hours at 90° C. and subsequently cooled to 60° C. g. of 50% strength sodium hydroxide solution are slowly added dropwise at 60° C. over the course of 2 hours with vigorous stirring, and at the same time the water present in the reaction mixture is continuously removed by azeotropic circulatory distillation under 60–90 mm Hg. After completion of addition of the alkali solution azeotropic distillation is continued for a further 20 minutes. The sodium chloride produced in the reaction is then separated off by filtration and rinsed with 100 ml. of epichlorhydrin. The combined epichlorhydrin solutions are extracted by shaking with 300 ml. of water. After separating off the aqueous phase, the organic phase is concentrated at 60° C./20 mm. Hg and then treated at 60° C./0.08 mm. Hg. until the weight remains constant.

A resin of low viscosity, with an epoxide content of 5.61 equivalents/kg. (100% of theory) is obtained in 94% yield (903 g.). The viscosity of the resin at 20° C. is 630 cp. and the total chlorine content 0.9%.

(b) Pilot experiment.—9.76 g. of 1,3-di-(β-hydroxy-n-propyl)-5,5-dimethylhydantoin (40 mols), 48.34 kg. of epichlorhydrin (522.6 mols) and 143.7 g. of tetramethylammonium chloride (1.47% calculated relative to diol) are heated, whilst stirring, to 90° C. in a stirred kettle equipped with dropping funnel, cascade, device for removing part of the circulating material, and vacuum pump, and the mixture is kept at this temperature for 1½ hours. 9.05 kg. of 50% strength sodium hydroxide solution (113.14 mols) are then added dropwise over the course of 2 hours at 60° C. under 60–70 mm. Hg, with continuous removal of water from the circulation. Thereafter reaction is allowed to continue for 10 minutes. The mixture is now cooled to 30° C. and 10 litres of water are stirred in to remove sodium chloride; the water is separated off and the organic phase is twice washed with 4 litres of 5% strength sodium dihydrogen phosphate solution at a time. The organic phase which has been separated off is introduced into a clean kettle and the epichlorhydrin is distilled off therein at 66° C. under 200 mm. Hg. In order to remove traces of volatile constituents the material is then heated for 20 minutes to 107° C. under a vacuum of 18 mm. Hg. The resin is now filtered through a pressure filter. 13.75 kg. of commercial 1,3-di-(β-hydroxy-n-propyl)-5,5-dimethylhydantoin diglycidyl ether. (96.5% of theory) are obtained. The epoxide content is 5.80 equivalents/kg. and the total chlorine content 0.65%.

Example 12

600 g. of 1,3-di-(β-hydroxyethyl)-5,5-dimethyl-6-isopropyl-5,6-dihydrouracil (2.222 mols) [manufactured according to Example G] and 2452 g. of epichlorhydrin (26.5 mols) together with 10.97 g. of tetraethylammonium chloride are stirred for 2 hours at 90° C. The reaction mixture is a clear pale yellow solution from the start. The reaction mixture is then cooled to 60° C. and 461 g. of 50% strength sodium hydroxide solution (5.77 mols) are slowly and uniformly added dropwise over the course of 2 hours with good stirring. At the same time the water present in the reaction mixture is continuously removed by azeotropic circulatory distillation under 60–90 mm. Hg, and is separated off. After completion of the reaction the mixture is cooled and the sodium chloride produced is removed by filtration. The salt is rinsed with a little epichlorhydrin and the combined epichlorhydrin solutions are washed with 150 ml. of water in order to remove remnants of sodium chloride and of catalyst. The aqueous phase is separated off and the epichlorhydrin solution is concentrated at 60° C./20 mm. Hg. Thereafter the product is treated at 60° C./0.08 mm. Hg in order to remove traces of volatile constituents, until constant weight is reached.

849 g. of a clear pale ochre-coloured resin (100% of theory) having 5.03 epoxide equivalents/kg. (96.1% of theory) are obtained. The diglycidyl ether resin has a density of 1.1569 g. (at 20° C.) and its viscosity according to Höppler is 1570 cp. at 20° C. The total chlorine content of the new diglycidyl ether manufactured in this way is 1.3%.

The infrared spectrum shows, through the disappearance of the OH— band at 2.90–2.92μ, through the appearance of the C—O—C band at 9.00μ and through the presence of the bands for the glycidyl either structure that the product has the structure given below.

The nuclear magnetic resonance spectrum (60 mc. H—NMR, recorded in deuterochloroform) also shows, inter alia through the presence of signals at δ=2.50–2.70 and δ=2.70–2.95 (originated from the glycidyl groups) that essentially a substance of the following structure has been produced.

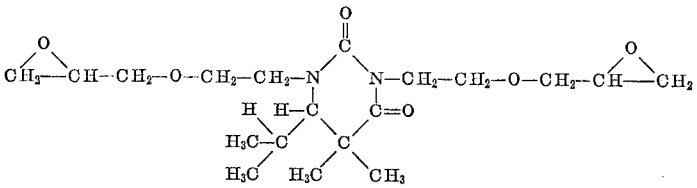

Example 13

A mixture of 657.2 g. of 1,3-di-(β-hydroxypropyl)-5,5-dimethyl-6-isopropyl-5,6-dihydrouracil (2.2 mols) [manufactured according to Example H], 2420 g. of epichlorhydrin and 10.83 g. of tetraethylammonium chloride is stirred for 2 hours at 90° and is subsequently dehydrohalogenated at 60° C. with 453.5 g. of 50° strength sodium hydroxide solution, exactly as described in Example 2, and worked up.

A viscous resin is obtained in 94.5% yield (853.7 g.). The epoxide content is 3.99 equivalents/kg. (82% of theory).

Example 14

182 g. of the 1,3-di-(β-hydroxyethylpolyethoxy-ethyl)-5,5-dimethylhydantoin manufactured according to Example J (about 0.085 mol) together with 312.5 g. of epichlorhydrin (3.37 mols) and 0.423 g. of tetraethylammonium chloride solution are stirred for 2 hours at 90° C. Thereafter 16.9 g. of 50% strength sodium hydroxide solution are added over the course of 2 hours with vigorous stirring, and at the same time the water present in the reaction mixture is continuously removed from the batch by azeotropic circulatory distillation; this is carried out at 80–82 mm. Hg.

After completion of the circulatory distillation the sodium chloride produced in the reaction is removed by filtration. The clear filtrate is concentrated at 60° C./20 mm. Hg and is then treated at 60° C. under a vacuum of 0.1 mm. Hg, in order to remove the last volatile constituents, until the weight remains constant.

185 g. of a light yellow clear transparent resin (100% of theory if there are 22 ethylene oxide units per N atom) are obtained, having an epoxide content of 0.903 equivalents/kg. (100% of theory).

The viscosity of this epoxide resin is 700 cp. at 25° C.; its specific gravity is 1.1387 g./ml.

The analyses give the following results:
Mean molecular weight (vapour pressure osmosis) =1100–1200.

*Elementary analysis.*—Percent: 53.95, C; 8.95, H; 35.75, O; 1.59, N; <0.3, chlorine.

The infrared spectrum shows, in addition to weak carbonyl absorptions at 5.65 and 5.74μ, attributable to the hydantoin, above all a strong absorption in the C—O—C region at 8.75–9.10μ.

Example 15

776.1 g. of the crude 1,3-di-(β-hydroxypropyl)-5-isopropylhydantoin manufactured according to Example K (3 mols) are stirred for 90 minutes at 90° C. with 3885.0 g. of epichlorhydrin (42 mols) and 14.85 g. of tetraethylammonium chloride.

Thereafter 624.0 g. of 50% strength sodium hydroxide solution (7.8 mols) are slowly added dropwise with good stirring over the course of 2½ hours; at the same time the water present in the reaction mixture is continuously removed by azeotropic circulatory distillation. 409 ml. of water are separated off (9.74% of theory). The reaction mixture is now separated from the sodium chloride produced by filtration, and the sodium chloride residue is rinsed with a little epichlorhydrin. The liquid phase is extracted by shaking with 200 ml. of water. After separating off the aqueous layer, the organic layer is completely concentrated under a waterpump vacuum at 60° C. and the residue is subsequently treated at 60° C. under 0.3 mm. Hg until it has reached constant weight.

1000.0 g. (90.0%) of a light ochre-coloured viscous epoxide resin are obtained, containing 4.17 epoxide equivalents/kg. (77.4% of theory). The resin mainly consists of 1,3 - di - (β-glycidyloxypropyl) - 5 - isopropylhydantoin.

Example 16

A mixture of 149.9 g. of 1,3-di-(β-hydroxy-n-propyl)-5,5-diethylhydantoin (0.55 mol) [manufactured according to Example N], 814 g. of epichlorhydrin (8.8 mols) and 2.49 g. of tetraethylammonium chloride (3 mol percent) is stirred for 2 hours at 90° C. 114.3 g. of 50% strength sodium hydroxide solution (1.43 mols) are then slowly and uniformly added dropwise over the course of 2 hours at 60° C. with vigorous stirring, and at the same time the water present in the reaction mixture is continuously removed by azeotropic circulatory distillation under 70–90 mm. Hg. After completion of the dehydrohalogenation the sodium chloride produced in the reaction is separated off by filtration and rinsed with a little epichlorhydrin.

The combined epichlorhydrin solutions are extracted by shaking with 150 ml. of water in order to remove sodium chloride and catalyst residues. The organic phase is concentrated at 60° C./20 mm. Hg and then dried to constant weight at 60° C./0.1 mm. Hg.

198.9 g. of a clear pale yellow resin (94.2% of theory) are obtained, having an epoxide content of 4.83 equivalents/kg. (92.7% of theory). The viscosity of this diglycidyl ether is 1375 cp. at 25° C. (measured according to DIN 53,015). The total chlorine content is 0.9%.

Example 17

A mixture of 258.3 g. of the 1,3-di-(β-hydroxy-n-propyl)-5-ethyl-5-methylhydantoin manufactured according to Example O (1 mol), 4.98 g. of lithium chloride and 1480 g. of epichlorhydrin is stirred for 1½ hours at 90° C. A circulatory distillation is then started at 60° C. internal temperature and 70–90 mm. Hg. 208.0 g. of 50% strength sodium hydroxide solution (2.60 mols) are then added dropwise over the course of 2 hours with vigorous stirring; at the same time the water present in the reaction mixture is continuously removed from the circulation. After the alkali treatment, the reaction mixture is filtered to separate off the salt, the sodium chloride is rinsed with a little epichlorhydrin, and the combined epichlorhydrin solutions are washed with 200 ml. of water to remove salt and catalyst remnants. After separating off the aqueous phase, the organic layer is concentrated at 60° C. bath temperature and 20 mm. Hg. It is subsequently dried at 60° C. and 0.2 mm. Hg until constant weight is reached.

368 g. of a clear slightly yellowish resin of low viscosity (99.4% of theory) containing 4.87 epoxide equivalents/kg. (corresponding to 90.4% of theory) are obtained.

Example 18

A mixture of 32.5 g. of 1,3-di-(β-hydroxyethyl)-5,5-dimethylhydantoin (manufactured according to Example C) [0.15 mol], 167.0 g. of epichlorhydrin (1.8 mols) and 0.746 g of tetraethylammonium chloride is stirred for 1.5 hours at 90° C. and a circulatory distillation is then started at 60° C. 31.20 g. of 50% strength aqueous sodium hydroxide solution (0.38 mol) are added dropwise over the course of 2 hours with good stirring and at the same time the water present in the reaction mixture is continuously separated off. The reaction mixture is now separated from the resulting sodium chloride by filtration and is washed with 30 ml of water. After separating off the aqueous layer, the mixture is concentrated at 60° C./20 mm. Hg. Thereafter it is dried at 60° C. and 0.2 mm. Hg, to remove the last traces of volatile constituents, until constant weight is reached. The diglycidyl ether of 1,3-di-(β-hydroxyethyl) - 5,5-dimethylhydantoin, containing 6.08 epoxide equivalents/kg. (100% of theory) is obtained in 97.1% yield (48.0 g.); the total chlorine content is less than 0.7%.

Example 19

A mixture of 366.3 g. of 1,3-di-(β-hydroxy-n-propyl)-5,5-dimethylhydantoin (1.5 mols) [manufactured according to Example A], 2240.0 g. of β-methylepichlorhydrin (21 mols) and 7.45 g. of tetraethylammonium chloride (3 mol percent) is stirred for 1⅓ hours at 90° C. 312.0 g. of 50% strength sodium hydroxide solution are then slowly added dropwise over the course of 2 hours at 60° C. internal temperature and at the same time the water present in the reaction mixture is continuously separated off by azeotropic circulatory distillation, this being achieved under a vacuum of 60–90 mm. Hg. The reaction mixture is filtered hot and the sodium chloride residue is rinsed with 100 ml. of β-methylepichlorhydrin.

The combined solutions are extracted by shaking with 200 ml of water. After separating off the water, the organic phase is completely concentrated at 60° C. bath temperature under a waterpump vacuum. Thereafter the resin is treated at 60° C. and 0.1 mm. Hg to remove the last traces of volatile constituents, until constant weight is reached. 462.5 g. of the 1,3-di-(β-methyl-β-glycidyloxy-n-propyl)-5,5-dimethylhydantoin (79.8% of theory) are obtained. The total chlorine content of the resin is 0.7%.

Example 20

367.8 g. of a diglycidyl ether of 1,3-di-(β-hydroxy-n-propyl)-5,5-dimethylhydantoin, manufactured industrially according to Example 6 and having an epoxide content of 5.43 equivalents/kg. (1.0 mol), are stirred at 120° C. and 0.2 ml. of 50% strength sodium hydroxide solution are then added. 64.06 g. of 5,5-dimethylhydantoin are stirred in over the course of 1 hour. The epoxide content is then 2.82 equivalents/kg. Thereafter the mixture is stirred for a further 2 hours at 135° C. and the hot liquid resin is poured out into a cold vessel.

A viscous (so-called) "advanced" epoxide resin having an epoxide content of 2.35 equivalents/kg. (theory=2.32 equivalents/kg.) is obtained.

Example 21

172.5 g. of a commercial diglycidyl ether of 1,3-di-(β-hydroxy-n-propyl)-5,5-dimethylhydantoin having an epoxide content of 5.79 equivalents/kg. (0.5 mol) [manufactured according to Example 11b], are stirred at 120° C. 0.1 ml of 50% strength sodium hydroxide solution are added and 67.0 g. of 1,1'-methylene-bis-5,5-dimethylhydantoin (0.25 mol) are gradually stirred in over the course of 1 hour. Thereafter a sample taken from the mix contains 3.47 epoxide equivalents/kg. The mixture is stirred for a further 10 hours at 235–240° C. and the light yellow resin is poured out into a cold vessel. The epoxide content of this highly viscous (so-called) "advanced" epoxide resin is then 2.08 equivalents/kg. (theory=2.08 equivalents/kg.).

Example 22

345 g. of a commercial diglycidyl ether of 1,3-di-(β-hydroxy-n-propyl)-5,5-dimethylhydantoin having an epoxide content of 5.79 equivalents/kg. (1.0 mol) [manufactured according to Example 11b], are stirred at 130° C. 0.2 ml. of 50% strength aqueous sodium hydroxide solution are added and 92.2 g. of 5,5-dimethyl-6-isopropyl-5,6-dihydrouracil (0.5 mol) are gradually stirred in over the course of 1 hour. The reaction is slightly exothermic on each addition of the dihydrouracil compound. After completion of the addition the epoxide content is 3.69 equivalents/kg. The mixture is stirred for a further 14 hours at 145–150° C. and the light yellow, clear, transparent, (so-called) "advanced" epoxide resin is poured out into a cold vessel. The epoxide content of this resin is 2.10 equivalents/kg. (theory=2.28).

Example 23

333.3 g. of a mixture of 75 parts of 1,3-di-(β-glycidyloxy-n-propyl)-5,5-dimethylhydantoin (manufactured according to Example 11b), and 25 parts of an industrial 3-(3',4'-epoxycyclohexyl)-2,4-dioxaspiro(5.5) - 8,9-epoxyundecane (epoxide content 6.10 equivalents/kg.: viscosity at 25° C., 15500 cp.) having an epoxide content of 6.0 equivalents/kg. are stirred at 130° C. and over 2 hours the addition of 134.2 g. of 1,1'-methylene-bis-(5,5-dimethylhydantoin) and 19.2 g. of hexahydrophthalic anhydride in small portions is carried out. The reaction is exothermic. After the addition, the mixture is stirred for a further hour at 165° C. and the resin is then poured out onto a metal sheet. The light yellow clear (so-called) "advanced" epoxide resin thus obtained contains 1.71 epoxide equivalents/kg. and its softening point is 68–70° C.

Example 24

690 g. of the commercial 1,3-di-(β-glycidyloxy-n-propyl)-5,5-dimethylhydantoin [manufactured according to Example IIb] are warmed to 135° C. whilst stirring, 0.6 g. of tetraethylammonium chloride are added and 228.3 g. of bisphenol A (diomethane) are added in small portions over the course of 1 hour. The reaction is slightly exothermic. The mixture is stirred for a further hour at 140° C. and the resin is subsequently cooled. A highly viscous product having 2.17 epoxide equivalents/kg. (theory, 2.25 equivalents/kg.) is obtained.

USE EXAMPLES

Example I

A clear, pale yellow, homogeneous mixture is manufactured at 40° C. from 68 parts of 1,3-di-(β-glycidyloxyethyl)-5,5-dimethylhydantoin (manufactured according to Example 3) and 51.2 parts of hexahydrophthalic anhydride. This mixture is of very low viscosity; it is poured into an aluminium mould of dimensions 95 x 41 x 12 mm. (wall thickness 0.15 mm.) prewarmed to 80° C. The curing takes place in one hour at 80° C.+4 hours at 120° C.+15 hours at 150° C. The pale yellow casting thus obtained is clear and transparent and shows the following results on flexural testing:

Deflection at break (VSM 77,103)—11.2 mm.
Flexural strength (VSM 77,103)—13.8 kg./mm.$^2$

Example II

A mixture of 220 g. of the diglycidyl ether resin 1,3-di-(β - glycidyloxyethyl)-5,5-dimethyl-6-isopropyl - 5,6 - dihydrouracil manufactured according to Example 12 with 144.7 g. of hexahydrophthalic anhydride is stirred at 40° C. to give a homogeneous solution and is cured in aluminium moulds in 2 hours/80° C.+2 hours/120° C.+15 hours/150° C. The clear transparent castings manufactured in this way show the following properties:

Flexural strength (VSM)—13.22 kp./mm.$^2$
Deflection (VSM)—9.9 mm.
Cold water absorption (4 days/20° C.)—0.53%
Tracking resistance (VDE)—step KA3c
Arcing resistance (VDE)—step L4
Dielectric loss factor tg δ (50 Hz.):
  at 20° C.—0.008
  at 50° C.—0.008
Breakdown voltage (VDE)—207 kv./cm.
Specific resistance (VDE) at 20° C.—4, 5.10$^{16}$ Ω·cm.

Example III 60 g. of the diglycidyl ether resin 1,3-di-(β-glycidyloxyethyl) - 5,5-dimethyl-6-isopropyl-5,6-dihydrouracil manufactured according to Example 12, together with 37.8 g. of phthalic anhydride, are stirred at 100° C. to give a homogeneous mixture, poured into aluminium moulds and cured under the curing conditions quoted in Example A. The gel time is 15 minutes at 100° C. Castings having the following mechanical properties are obtained:

Flexural strength (VSM)—15.37 kp./mm.$^2$
Deflection (VSM)—9.4 mm.
Heat distortion point according to Marten DIN—74° C.
Cold water absorption (4 days/20° C.)—0.49%

Example IV

A homogeneous mixture is prepared at room temperature from 100 g. of the commercial epoxide resin manufactured according to Example 12 and 12.2 g. of triethylenetetramine by stirring and is poured into an aluminium mould (10 x 40 x 120 mm., wall thickness about 0.1 mm.) and cured in 24 hours at 40° C. The casting shows the following properties:

Flexural strength (VSM)—10.06 kp./mm.$^2$
Deflection (VSM)—7.9 mm.
Impact strength (VSM)—29.54 cmkp./cm.$^2$

Example V 250.5 g. of the diglycidyl ether resin 1,3-di-(β-glycidyloxypropyl)-5,5-dimethyl-6-isopropyl - 5,6 - dihydrouracil manufactured according to Example 13 are worked into a homogeneous mixture with 131.5 g. of hexahydrophthalic anhydride at 45° C. and the mixture is cured in aluminium moulds in accordance with the temperature programme mentioned in Example A. The mouldings obtained show the following properties:

Flexural strength (VSM)—8.40 kp./mm.$^2$
Impact strength (VSM)—6.54 cmkp/cm.$^2$
Heat distortion point according to Martens (DIN)—57° C.
Breakdown voltage (VDE 0303)—226.5 kv./cm.
Dielectric loss factor tg δ (50 Hz.) at 20° C.—0.007
Dielectric constant (DIN 53483) at 20° C.—3.60
Specific resistance (VDE 0303) at 20° C.—4.5·10$^{16}$Ω cm.
Arcing resistance (ASTM 495) (mean value from 5 measurements)—75.0 sec.

Example VI (a) 75 parts of 1,3-di-(β-hydroxy-n-propyl)-5,5-dimethylhydantoin (epoxide resin A) [manufactured according to Example 11a] are mixed with 25 parts of 3',4'-epoxyhexahydrobenzal-3,4-epoxycyclohexane - 1,1 - dimethanol (epoxide resin B), 90 parts of hexahydrophthalic anhydride and 6 parts of sodium hexanetriolate at 80° C. The mixture is poured into moulds heated to 80° C. and allowed to gel for 4 hours at 80° C. After gelling the castings are cured for 14 hours at 140° C. Dimensions of the castings, 140 x 40 x 10 mm.

(b) 60 parts of 1,3-di-(β-hydroxy-n-propyl)-5,5-dimethylhydantoin are mixed with 40 parts of 3',4' - epoxyhexanehydrobenzal-3,4-epoxycyclohexane - 1,1 - dimethanol, 90 parts of hexahydrophthalic anhydride and 6 parts of sodium hexanetriolate at 80° C. The mixture is processed into castings as under (a).

(c) 100 parts of 1,3-di-(β-hydroxy-n-propyl) - 5,5 - dimethylhydantoin are mixed with 85 parts of hexahydrophthalic anhydride and 6 parts of sodium hexanetriolate at 80° C. The mixture is processed into castings as under (a).

(d) 100 parts of 3',4' - epoxyhexahydrobenzal - 3,4-epoxycyclohexane - 1,1 - dimethanol are mixed with 95 parts of hexahydrophthalic anhydride and 6 parts of sodium hexanetriolate at 80° C. The mixture is processed into castings as under (a).

The mechanical properties of the castings obtained under VI(a) to VI(d) can be seen from the following tabulation:

|  | (a) | (b) | (c) | (d) |
|---|---|---|---|---|
| Molar ratio of epoxide resin A: epoxide resin B | 2:1 | 1:1 | 1:0 | 0:1 |
| Flexural strength (VSM), kp./mm.$^2$ | 17 | 14 | 14 | 6 |
| Deflection (VSM), mm | 11 | 7 | 7 | 2 |
| Impact strength (VSM), cmkp./cm.$^2$ | 22 | 15 | 10 | 5 |
| Martens value (DIN), ° C | 95 | 125 | 75 | 170 |
| H$_2$O absorption (4 days/20° C.) percent | 0.35 | 0.4 | 0.4 | 0.5 |

Example VII (a) 75 parts of 1,3-di-(β-hydroxy-n-propyl)-5,5-dimethylhydantoin (epoxide resin A) [manufactured according to Example 11(a)] are mixed with 25 parts of 3',4'-epoxycyclohexylmethyl - 3,4 - epoxycyclohexanecarboxylate (epoxide resin C), 90 parts of hexahydrophthalic anhydride and 6 parts of sodium hexanetriolate at 80° C. The mixture is poured into moulds heated to 80° C. and allowed to gel for 4 hours at 80° C. After gelling, the castings are cured for 14 hours at 140° C. Dimensions of the castings: 140 x 40 x 10 mm.

(b) 100 parts of 1,3-di-(β-hydroxy-n-propyl)-5,5-dimethylhydantoin (epoxide resin A) are mixed with 85 parts of hexahydrophthalic anhydride and 6 parts of sodium hexanetriolate at 80° C. The mixture is processed into castings as under III(a).

(c) 100 parts of 3',4'-epoxycyclohexylmethyl-3,4-epoxycyclohexanecarboxylate (epoxide resin C) are mixed with 105 parts of hexahydrophthalic anhydride and 6 parts of sodium hexanetriolate at 80° C. The mixture is processed into castings as under III(a).

The mechanical properties of the castings obtained under VII(a) to VII(c) can be seen from the following tabulation:

|  | (a) | (b) | (c) |
|---|---|---|---|
| Molar ratio of epoxide resin A: epoxide resin C | 2:1 | 1:0 | 0:1 |
| Flexural strength (VSM), kp./mm.$^2$ | 16 | 14 | 11 |
| Deflection (VSM), mm | 11 | 7 | 6 |
| Impact strength (VSM), cmkp./cm.$^2$ | 22 | 10 | 8 |
| Martens value (DIN), ° C | 80 | 75 | 160 |
| H$_2$O absorption (4 days/20° C.), percent | 0.5 | 0.4 | 0.4 |

Example VIII

A mixture of 77.5 g. of the epoxide resin manufactured according to Example 14, 1,3-di-(β-glycidyloxy-polyethoxy - ethyl) - 5,5 - dimethylhydantoin, having 0.903 epoxide equivalents/kg., 9.7 g. of an industrially manufactured (3',4' - epoxycyclohexylmethyl)-3,4-epoxycyclohexanecarboxylate (7.2 epoxide equivalents/kg.), 18.4 g. of hexahydrophthalic anhydride and 0.2 g. of sodium hexanetriolate is stirred at 50° C. to give a homogeneous solution and poured into an aluminium mould pre-warmed to 80° C. (14 x 4.2 x 1.2 cm., wall thickness about 0.1 mm.). Curing takes place in 2 hours/80° C.+3 hours/120° C.+15 hours/150° C.

A clear, transparent, pale orange-yellow casting is thus obtained which is so flexible and rubbery-elastic, that strips required for measuring the mechanical properties cannot be cut therefrom.

Example IX (a) 66.0 g. of the epoxide resin manufactured according to Example 15, 1,3-di-(β-glycidyloxypropyl)-5-isopropylhydantoin, having an epoxide content of 4.17 equivalents/kg., are processed with 36.2 g. of hexahydrophthalic anhydride at 60° C. to give a homogeneous melt and the melt is poured into a thin-walled aluminium mould pre-warmed to 80° C. (14 x 4.2 x 1.0 cm., wall thickness about 0.1 mm.). Curing takes place in 2 hours at 80° C.+3 hours at 120° C.+15 hours at 150° C.

The glass-clear moulding thus produced shows the following properties:

Flexural strength (VSM 77,103)—11.34 kp./mm.$^2$
Deflection (VSM 77,103)—4.5 mm.
Impact strength (VSM 77,105)—8.3 cmkp./cm.$^2$ (b) 38.4 g. of the epoxide resin manufactured according to Example 15, having an epoxide content of 4.17 equivalents/kg., are mixed with 22.4 g. of a commercially available cycloaliphatic epoxide resin which mainly consists of (3',4'-epoxycyclohexylmethyl) - 3,4 - epoxycyclohexanecarboxylate and has an epoxide content of 7.2 equivalents/kg., and with 42.0 g. of hexahydrophthalic anhydride. 2.0 g. of sodium hexanetriolate are further added to this mixture as an accelerator.

The mixture becomes homogeneous at 50° C. and is then poured into an aluminium mould pre-warmed to 80° C. (14.0 x 4.2 x 1.0 cm., wall thickness about 0.1 mm.) and cured in 2 hours at 80° C.+3 hours at 120° C.+15 hours at 150° C. The moulding shows the following mechanical properties:

Flexural strength (VSM 77,103)—12.3 kp./mm.$^2$
Deflection (VSM 77,103)—4.5 mm.
Impact strength (VSM 77,105)—13.7 cmkp/cm.$^2$
Heat distortion point according to Martens, DIN 54,358—78° C.
Cold water absorption (4 days, 20° C.)—0.39%

Example X (a) A mixture of 180 g. of the 1,3-di-(β-glycidyloxyethyl)-5,5-dimethylhydantoin (epoxide content 5.56 equivalents/kg.) manufactured according to Example 18 and 131 g. of hexahydrophthalic anhydride is processed at 40° C. to give a homogeneous, clear, pale yellow and very mobile mixture. This mixture is poured into aluminium moulds pre-warmed to 80° C., having the following dimensions: (a) 14 x 4.2 x 1.0 cm. at about 0.1 mm. wall thickness, for mechanical tests; (b) 13.0 x 13.0 x 0.4 or 0.2 cm. at about 4.0 mm. wall thickness for electrical tests. Curing is carried out in 2 hours at 80° C.+2 hours at 120° C.+15 hours at 150° C. The pale yellow, clear, transparent mouldings thus obtained show the following properties:

Flexural strength (VSM 77,103)—14.3 kp./mm.$^2$
Deflection (VSM 77,103)—12.7 mm.
Impact strength (VSM 77,105)—13.7 cmkp/cm.$^2$
Heat distortion point according to Martens (DIN 53,458)—75° C.
Water absorption (4 days/20° C.)—0.68%
Breakdown voltage (VDE 0303)—226 kv./cm.
Tracking resistance (VDE 0303), level—KA3c
Arcing resistance (VDE 0303), level—L4
Specific resistance (VDE 0303), 20° C.—6.10$^{16}\Omega$·cm.
Dielectric constant (DIN 53,483), 20° C.—3.60
Dielectric loss factor tg $\delta$ (50 Hz.) DIN 53,483, 20° C.—0.006

(b) 90 g. of the 1,3-di-($\beta$-glycidyloxyethyl)-5,5-dimethylhydantoin manufactured according to Example 18, having an epoxide content of 5.56 equivalents/kg., are mixed with 59.5 g. of a technical polyaminoamide curing agent having an amine number of 500 and a viscosity of 220 cp./25° C. at 30° C. and the mixture is the poured into aluminium moulds of 4 mm. wall thickness. Curing takes place in 24 hours at 40° C.+6 hours at 100° C. The mouldings manufactured in this way show the following properties:

Tensile strength (DIN 53,455)—3.17 kp./mm.$^2$
Elongation at break (DIN 53,455)—35.1%

Example XI (a) A homogeneous mixture of 196.7 g. of the 1,3-di-$\beta$-glycidyloxy-n-propyl-5,5-dimethylhydantoin manufactured according to Example 11(a) (epoxide content 5.60 equivalents/kg.) and 144.0 g. of hexahydrophthalic anhydride is prepared at 55° C. This mixture is poured into moulds pre-warmed to 80° C., such as are used in Example X(a). The curing takes place in 2 hours at 80° C.+2 hours at 120° C.+15 hours at 150° C. The clear, pale yellow, mouldings thus obtained have the following properties:

Flexural strength (VSM 77,103)—14.75 kp./mm.$^2$
Deflection (VSM 77,103)—10.0 mm.
Impact strength (VSM 77,105)—12.25 cmkp./cm.$^2$
Heat distortion point according to Martens (DIN 53,358)—75° C.
Water absorption (4 days 20° C.)—0.48%
Breakdown voltage (VDE 0303)—236 kv./cm.
Tracking resistance (VDE 0303), level—KA3c
Arcing resistance (VDE 0303), level—L4
Specific resistance (VDE 0303), 20° C.—4.7.10$^{16}\Omega$·cm.
Dielectric constant (DIN 53,483), 20° C.—3.50
Dielectric loss factor tg $\delta$ (50 Hz.; DIN 53,483), 20° C.—0.005

(b) 304 g. of the diglycidyl ether used in Example XI(a), having an epoxide content of 5.60 equivalents/kg., are homogeneously mixed at room temperature with 37.7 g. of triethylenetetramine and poured into the moulds used in Example X(a). Curing took place in 24 hours at room temperature (the mould of 0.1 mm. wall thickness is placed in cold water at 15° C. in order to conduct away the heat of reaction)+6 hours at 100° C. The light yellow castings thus obtained have the following properties:

Flexural strength (VSM 77,103)—11.29 kp./mm.$^2$
Deflection (VSM 77,103)—5.2 mm.
Impact strength (VSM 77,105)—8.13 cmkp./cm.$^2$
Tracking resistance (VDE 0303), level—KA3c
Arcing resistance (VDE 0303), level—L4
Specific resistance (VDE 0303), 20° C.—10$^{15}\Omega$·cm.

Example XII (a) A mixture of 62.2 g. of the 1,3-di($\beta$-glycidyloxy-n-propyl)-5,5-diethylhydantoin manufactured according to Example 16, having an epoxide content of 4.83 equivalents/kg. and 39.5 g. of hexahydrophthalic anhydride is poured at 80° C. into an aluminium mould (14 x 4.2 x 1.0 cm., wall thickness about 0.1 mm.) and cured in 2 hours at 80° C.+3 hours/120° C.+15 hours/150° C. The moulding thus obtained has the following mechanical properties:

Flexural strength (VSM 77,103)—11.05 kp./mm.$^2$
Deflection (VSM 77,103)—12.70 mm.
Impact strength (VSM 77,105)—9.40 cmkp./cm.$^2$
Water absorption (4 days, 20° C.)—0.38%

The gel time of a 50 g. sample of the above mixture is is 429 minutes at 80° C. (measured by means of the Tecan gelation timer).

(b) 41.4 g. of the diglycidyl ether manufactured according to Example 16 are mixed at 50° C. with 27.8 g. of a commercially available cycloaliphatic epoxide resin mainly consisting of (3',4'-epoxy-cyclohexylmethyl)-3,4-epoxy-cyclohexanecarboxylate (epoxide content 7.2 equivalents/kg.), with 52.6 g. of hexahydrophthalic anhydride and with 2.0 g. of sodium hexanetriolate. The mixture is poured into an aluminium mould according to Example XII(a) and cured in 2 hours at 80° C.+3 hours at 100° C.+15 hours at 150° C. A pale yellow, clear, transparent casting having the following properties is produced:

Flexural strength (VSM 77,103—13.8 kp./mm.$^2$
Deflection (VSM 77,103)—6.5 mm.
Heat distortion point according to Martens (DIN 54,358)—88° C.
Water absorption (4 days, 20° C.)—0.35%

Example XIII (a) 61.6 g. of the 1,3-di($\beta$-glycidyloxy-n-propyl)-5-ethyl-5-methylhydantoin manufactured according to Example 17 (4.87 epoxide equivalents/kg.) are processed with 39.5 g. of hexahydrophthalic anhydride at 50° C. to give a homogeneous liquid and poured into an aluminium mould pre-warmed to 80° C. (14 x 4.2 x 1.0 cm., wall thickness about 0.1 mm.). Curing takes place in 2 hours at 80° C.+3 hours at 120° C.+15 hours at 150° C. The article cured in this way shows the following properties:

Flexural strength (VSM 77,103)—12.3 kp./mm.$^2$
Deflection (VSM 77,103)—10.5 mm.
Impact strength (VSM 77,105)—12.52 cmkp./cm.$^2$
Water absorption (4 days/20° C.)—0.39%

(b) 61.6 g. of the 1,3-di-($\beta$-glycidyl-n-propyl)-5-ethyl-5-methylhydantoin manufactured according to Example 17 are stirred with 37.85 g. of phthalic anhydride at 100° C. to give a homogeneous solution and this solution is poured into an aluminium mold according to Example XIII(a), pre-warmed to 120° C. Curing takes place in 3 hours at 120° C. and in 15 hours at 150° C. A moulding with the following mechanical data is obtained:

Flexural strength (VSM 77,103)—14.07 kp./mm.$^2$
Deflection (VSM 77,103)—12.6 mm.
Impact strength (VSM 77,105)—10.61 cmkp./cm.$^2$
Heat distortion point according to Martens (DIN 54,358)—79° C.
Water absorption (4 days/20° C.)—0.41%

(c) A mixture of 34.2 g. of 1,3-di-($\beta$-glycidyloxy-n-propyl)-5-ethyl-5-methylhydantoin, 22.8 g. of commercial (3',4' - epoxycyclohexylmethyl) - 3,4-epoxycyclohexanecarboxylate, 43.8 g. of hexahydrophthalic anhydride and 2.0 g. of sodium hexanetriolate is poured at 80° C. into an aluminium mould according to Example XIII(a) and cured in 2 hours at 80° C.+3 hours at 120° C.+15 hours at 150° C. A light yellow moulding having the following properties is obtained:

Flexural strength (VSM 77,103)—14.05 kp./mm.$^2$
Deflection (VSM 77,103)—12.4 mm.
Impact strength (VSM 77,105)—13.9 cmkp./cm.$^2$
Heat distortion point according to Martens (DIN 54,358)—96° C.
Water absorption (4 days/20° C.)—0.35%

Example XIV 58.4 g. of the 1,3-di-(β-methyl-β-glycidyloxy-n-propyl)-5,5-dimethylhydantoin manufactured according to Example 19, having an epoxide content of 4.80 equivalents/kg., are processed with 36 g. of phthalic anhydride at 110° C. to give a homogeneous light yellow solution. This clear solution is poured into an aluminium mould pre-warmed to 120° C. (14 x 4.2 x 1.2 cm., wall thickness about 0.1 mm.) and is cured in 4 hours at 120° C.+24 hours at 150° C. A clear, transparent, pale yellow moulding having the following mechanical properties is obtained:

Flexural strength (VSM 77,103)—10.22 kp./mm.$^2$
Deflection (VSM 77,103)—2.7 mm.
Impact strength (VSM 77,105)—8.23 cmkp./cm.$^2$
Heat distortion point according to Martens (DIN 54,358)—92° C.
Water absorption (4 days/20° C.)—0.57%.

Example XV (a) A mixture of 76.2 g. of the (so-called) "advanced" epoxide resin manufactured according to Example 21, having an epoxide content of 2.08 equivalents/kg., and 21.0 g. of hexahydrophthalic anhydride is stirred at 80° C. to give a homogeneous solution and poured into aluminium moulds pre-warmed to 80° C. (dimensions: 14 x 4.2 x 1.2 cm., wall thickness about 0.1 mm.). Curing takes place in 1 hour at 80° C.+3 hours at 120° C.+15 hours at 150° C. The articles manufactured in this way show the following properties:

Flexural strength (VSM 77,103)—6.89 kp./mm.$^2$
Deflection (VSM 77,103)—2.0 mm.
Impact strength (VSM 77,105)—5.13 cmkp./cm.$^2$
Heat distortion point according to Martens (DIN 54,359)—62° C.

(b) 74.6 g. of the (so-called) "advanced" epoxide resin manufactured according to Example 21, having 2.08 epoxide equivalents/kg., are mixed at 80° C. with 29 g. of an anhydride curing agent which is liquid at room temperature and consists of 9 parts of phthalic anhydride, 13 parts of tetrahydrophthalic anhydride, 78 parts of hexahydrophthalic anhydride and 15 parts of cresyl glycid. This mixture is poured into aluminium moulds pre-warmed to 80° C., in accordance with Example XV(a). Curing also takes place in accordance with Example XV(a). The moulding obtained shows the following properties:

Flexural strength (VSM 77,103)—8.54 kp./mm.$^2$
Deflection (VSM 77,103)—2.5 mm.

Example XVI

A mixture of 74.6 g. of the (so-called) "advanced" epoxide resin manufactured according to Example 22, having an epoxide content of 2.10 equivalents/kg., and 29 g. of the anhydride curing agent mixture described in Example XV(b) is processed at 80° C. to give a homogeneous solution and is poured into an aluminium mould pre-warmed to 80° C. (14 x 4.2 x 1.2 cm., wall thickness about 0.1 mm.). Curing takes place in 1 hour at 80° C.+3 hours at 120° C.+15 hours at 150° C. The casting has the following properties:

Impact strength (VSM 77,105)—7.53 cmkp./cm.$^2$
Heat distortion point according to Martens (DIN 54,358)—60° C.
Cold water absorption (4 days/20° C.)—0.93%

We claim:
1. A diglycidyl ether of formula

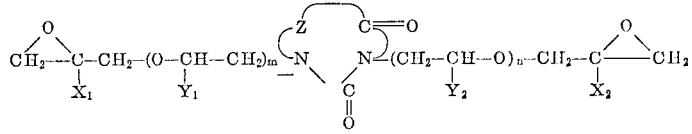

wherein $X_1$, $X_2$, $Y_1$ and $Y_2$ each represents a member selected from the group consisting of a hydrogen atom and a methyl group and Z represents a member selected from the group consisting of a divalent residue of formulae

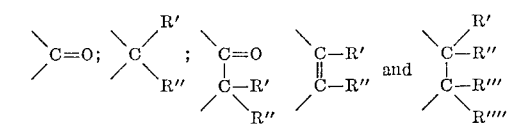

wherein R', R'', R''' and R'''' each represents a member selected from the group consisting of alkyl with 1 to 5 carbon atoms, alkenyl with 1 to 5 carbon atoms, cyclohexyl, cyclohexenyl, and phenyl, or when the residue Z represents the formulae

R' and R'' together can also form a member selected from the group consisting of divalent tetramethylene and pentamethylene residue, and $m$ and $n$ each represent an integer having a value of 0 to 30, preferably of 0 to 4, with the sum of $m$ and $n$ having to be at least 1.

2. 1-glycidyl-3-β-glycidyloxyethyl-6-methyluracil.
3. 1,3-di-(β-glycidyloxyethyl)-5,5-dimethylhydantoin.
4. 1,3-di-(β-glycidyloxyethyl)-5-ethyl-5-phenylbarbituric acid.
5. 1,3-di-[β-(β'-methylglycidyloxy)-ethyl]-5,5-dimethylhydantoin.
6. 1,3-di-(β-glycidyloxy-n-propyl)-5,5-dimethylhydantoin.
7. 1,3-di-(β-glycidyloxy-n-propyl)-5,5-diethylbarbituric acid.
8. 1,3-di-(β-glycidyloxyethoxyethoxyethyl)-5,5-dimethylhydantoin.
9. 1,3-di-(β-glycidyloxy-n-propyl)-5-isopropylhydantoin.
10. 1,3-di-(β-glycidyloxy-n-propyl)-5,5-diethylhydantoin.
11. 1,3-di-(β-glycidyloxy-n-propyl)-5-ethyl-5-methylhydantoin.
12. 1,3-di-(β-glycidyloxyethyl)-5,5-dimethyl-6-isopropyl-5,6-dihydrouracil.
13. 1,3-di-(β-glycidyloxy-n-propyl)-5,5-dimethyl-6-isopropyl-5,6-dihydrouracil.
14. 1,3-di-(β-methyl-β-glycidyloxy-n-propyl)-5,5-dimethylhydantoin.

References Cited

UNITED STATES PATENTS 3,503,979    3/1970    Habermeier _____ 260—260

NICHOLAS S. RIZZO, Primary Examiner
A. M. T. TIGHE, Assistant Examiner

U.S. Cl. X.R.

260—2, 37, 57, 69, 72, 78, 260, 309.5